(12) United States Patent
Lau

(10) Patent No.: US 8,061,509 B2
(45) Date of Patent: Nov. 22, 2011

(54) BULK MATERIALS PUMP AND ITS USE

(75) Inventor: TeckSoon Lau, Amsterdam (NL)

(73) Assignee: Shell Oil Company, Houston, TX (US)

( * ) Notice: Subject to any disclaimer, the term of this patent is extended or adjusted under 35 U.S.C. 154(b) by 833 days.

(21) Appl. No.: 12/137,359

(22) Filed: Jun. 11, 2008

(65) Prior Publication Data

US 2009/0053038 A1    Feb. 26, 2009

(30) Foreign Application Priority Data

Jun. 13, 2007  (EP) ..................................... 07110157

(51) Int. Cl.
*B65G 31/04*       (2006.01)
(52) U.S. Cl. .............................. 198/617; 198/642; 137/1
(58) Field of Classification Search .................. 198/617, 198/642; 137/1
See application file for complete search history.

(56) References Cited

U.S. PATENT DOCUMENTS

| | | | |
|---|---|---|---|
| 3,817,498 A | 6/1974 | Frankfurth et al. ............ | 259/192 |
| 4,516,674 A * | 5/1985 | Firth .............................. | 198/617 |
| 4,988,239 A * | 1/1991 | Firth .............................. | 406/99 |
| 5,051,041 A * | 9/1991 | Firth .............................. | 406/99 |
| 5,355,993 A * | 10/1994 | Hay .............................. | 198/642 |
| 5,381,886 A * | 1/1995 | Hay .............................. | 198/642 |
| 5,402,876 A * | 4/1995 | Hay .............................. | 198/638 |
| 5,485,909 A * | 1/1996 | Hay .............................. | 198/642 |
| 6,832,887 B2 * | 12/2004 | Baer et al. ...................... | 415/90 |

FOREIGN PATENT DOCUMENTS

| EP | 015037 | | 9/1980 |
|---|---|---|---|
| GB | 2104960 A | * | 3/1983 |

OTHER PUBLICATIONS

Derek Aldred et al: International Freiberg Conference on IGCC & XtL Technologies, Jun. 16-18, 2005, Continuous Metered Injection of Coal Into Gasification and PFBC System Operating Pressures Exceeding 38 Bar (560 PSI)—Stamet Inc.

* cited by examiner

*Primary Examiner* — George Fourson, III

(57) ABSTRACT

The invention is directed to a bulk materials pump and its use. The pump comprises a housing having a flow path for bulk materials located between an inlet and an outlet of said housing, wherein said flow path in said housing is further defined by a space between two rotatable drive disks spaced from each other and wherein a materials scraper is present between said drive disks at the outlet to avoid materials being transported between said drive disks back to the inlet.

9 Claims, 2 Drawing Sheets

BULK MATERIALS PUMP AND ITS USE

This patent application claims the benefit of European patent application No. 07110157.0, filed Jun. 13, 2007 and U.S. Provisional Application 60/943964, filed Jun. 14, 2007, both of which are incorporated herein by reference

TECHNICAL FIELD OF THE INVENTION

The invention is directed to a bulk materials pump and its use to convey bulk materials from a lower pressure to a higher pressure.

BACKGROUND OF THE INVENTION

It is known from U.S. Pat. No. 4,955,989 to convey bulk materials from a lower pressure container to a higher-pressure container by means of a lock hopper. Such a lock hopper system is commercially used to bring a solid fuel, for example coal, to the same elevated pressure as the pressure of an entrained flow gasification reactor. In the reactor the solid fuel is partially oxidized to a mixture of carbon monoxide and hydrogen.

A disadvantage of such a lock hopper system is that it involves many process handling operations, like opening of valves, pressurizing sluice vessels, emptying sluice vessels and the like. The process as a consequence also involves a complicated process control. There is thus a desire to simplify this system.

A possible solution to simplify the lock hopper system is to use a bulk materials pump. The use of such a pump is advantageous because the solids are brought to the higher-pressure environment in a continuous manner, thereby avoiding the above-described handling of the lock hopper system. Many bulk material pumps have been suggested for this use of which some examples are described in EP-A-015037, U.S. Pat. No. 4,120,410 and U.S. Pat. No. 4,605,352. Although these apparatuses have their specific advantages none of them have actually been successfully developed commercially. Most likely because they are complex and/or involve a high-energy input.

In a more recent publication, U.S. Pat. No. 5,355,993, a bulk material pump is described wherein the bulk material pump has a pair of rotatable disk members arranged coaxial and spaced away from each other. The disk members are arranged in a peripheral wall having an inlet and outlet for bulk material. In use the material as supplied at the inlet is caught between the disks and transported to the outlet end. A scraper positioned between the disks avoids material returning to the inlet. The disk may be tilted with respect to each other resulting in that the distance between said disks at the inlet is greater than the distance between said disks at the outlet.

Although the materials pump of U.S. Pat. No. 5,355,993 has specific advantages over the earlier designs some disadvantages, like a high-energy consumption, are still present which do not allow direct application in a process to transport material from a lower pressure environment to a higher-pressure environment.

It would be advantageous to provide a bulk material pump having a lower energy consumption.

SUMMARY OF THE INVENTION

The present invention provides such a bulk material pump. In a preferred embodiment, the present invention provides a bulk materials pump comprising a housing having a flow path for bulk materials located between an inlet and an outlet of said housing, wherein said flow path in said housing is further defined by a space between two rotatable drive disks spaced from each other and wherein a materials scraper is present between said drive disks at the outlet to avoid materials being transported between said drive disks back to the inlet, wherein the rotation axis of both disks are tilted with respect to each other resulting in that the distance between said drive disks at the inlet is greater than the distance between said disks at the outlet and wherein the surfaces of the two drive disks facing the flow path are conical shaped such that at the outlet the two facing surfaces are parallel relative to each other and at the inlet the two surfaces are positioned under an angle relative to each other.

Because the bulk materials pump of the present invention has disks, which rotate along separate axis, which are tilted with respect to each other, a more efficient capturing and compressing of the bulk material is achieved. The higher efficiency results in that less energy input is required than when the prior art pump would have been used having the two disks rotating coaxial. A further advantage is that because of the compacting of the material a better gas seal is achieved between the disks. This improved gas seal is especially important when the pump is used to bring materials to a higher pressure environment.

BRIEF DESCRIPTION OF THE DRAWINGS

The invention shall be further illustrated by making use of the following Figures.

DETAILED DESCRIPTION OF THE INVENTION

The surfaces of the two drive disks facing the flow path are shaped such that at the outlet the two facing surfaces are substantially parallel relative to each other and at the inlet the two surfaces are positioned under an angle relative to each other. Such a surface may be spherical shaped or more preferably conically shaped. With conical shaped is also meant a shape wherein the surface facing the flow path of the bulk materials is made up of a number of pie shaped surfaces which together form a substantially conical shape.

The materials scraper may be a fixed device positioned between the disks and fixed to the housing of the pump near the outlet for bulk material. The scraper preferably extends up to and beyond the point where the two rotational axis meet between the two disks Alternatively the materials scraper is a third rotatable disk located partly between said drive disks at the outlet and wherein the direction of rotation of all three disks is the same. By using a rotatable disk as a scraper a more efficient discharge of solids from between the two disks is achieved.

Figure 1:
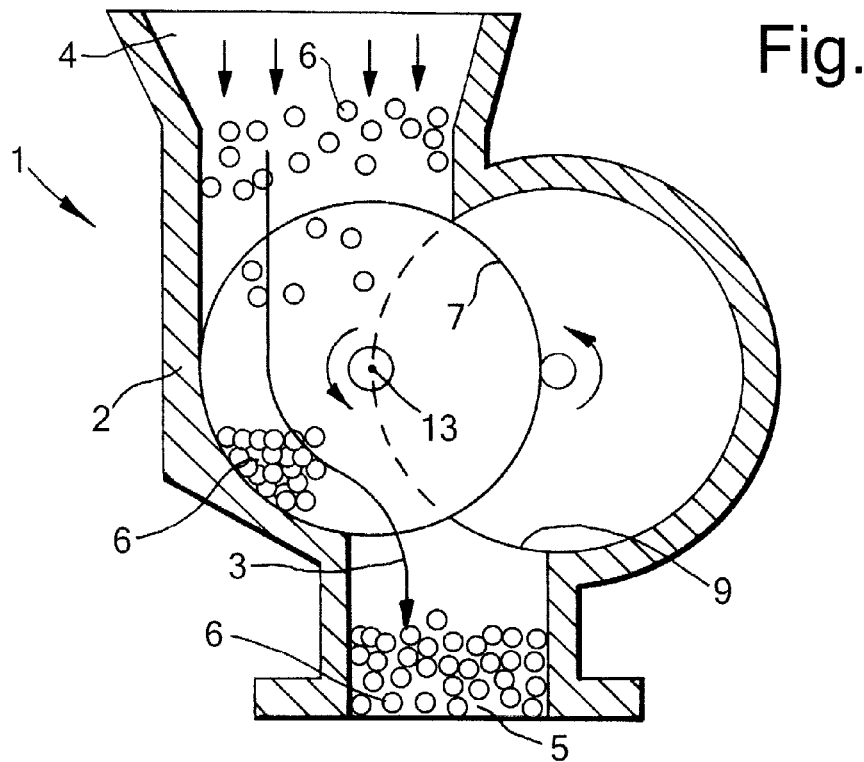
FIG. 1 is a cross-sectional side view of the bulk materials pump having a rotatable scraper.

FIG. 1 shows a bulk materials pump 1 having a housing 2. A flow path 3 is present for the bulk materials 6 located between an inlet 4 and an outlet 5 of said housing 2. The orientation of the bulk materials pump is preferably as drawn in FIG. 1 with an inlet at the top end and an outlet at the bottom end. In this manner bulk materials will enter the inlet and be discharged from the outlet by means of gravity. The flow path 3 in said housing 2 is present between two rotatable drive disks 7 and 8 of which only 7 is shown in FIG. 1. The flow path 3 is further defined by a rotatable materials scraper 9 as positioned between said drive disks 7 and 8. Disks 7, 8 and scraper 9 rotate such that surfaces of said disks 7 and 8 and scraper 9, which surfaces partly define flow path 3, move in the direction of flow path 3 as shown. This will enhance the movement of the material 6 and the discharge of the material 6 from between the disks 7 and 8 at outlet 5.

Figure 2:
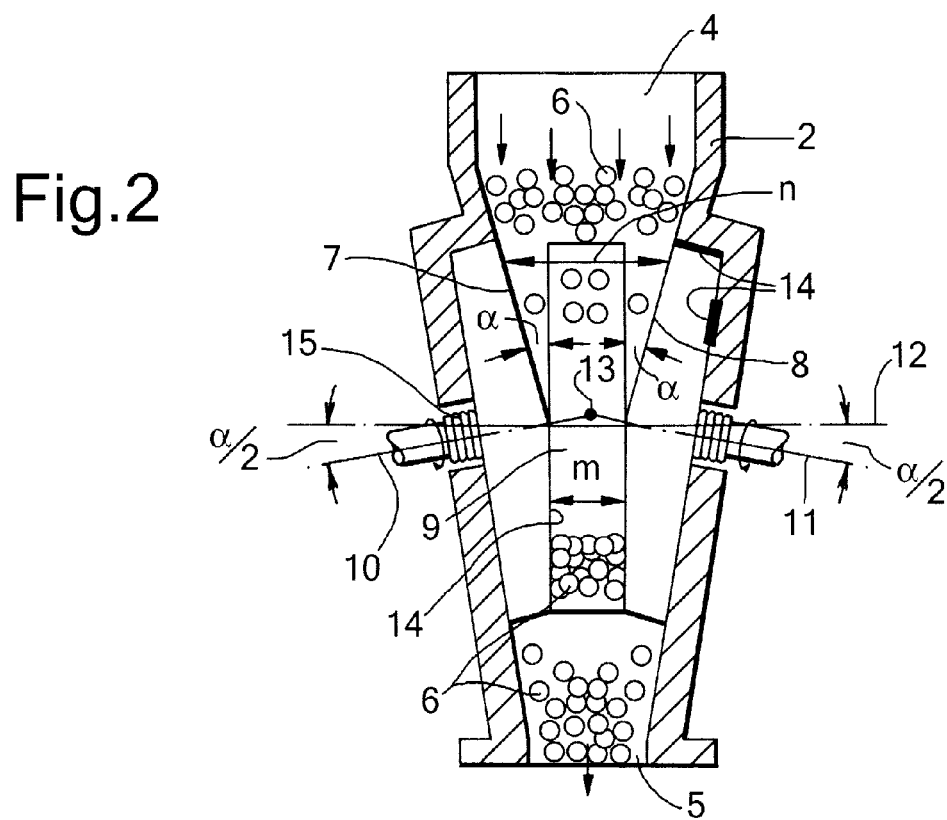
FIG. 2 is a cross-sectional front view of the bulk materials pump of FIG. 1.

The rotatable materials scraper 9 extends up to point 13 where the two rotational axis 10 and 11 meet between the two disks 7 and 8 as shown in FIG. 2.

FIG. 2 illustrates drive disks 7 and 8 having rotation axis 10 and 11 respectively. Disks 7 and 8 have a preferred conical shaped surface facing the flow path 3. As shown disks 7 and 8 are tilted with respect to each other. Preferably the angle α between upright surface of the disk facing the flow path 3 and the vertical as shown in FIG. 2 is between 5 and 45°. The value for the angle α will be dependent on the compactability of the material 6. The axis 10 and 11 make an angle of α/2 with the horizontal 12. The axis 10 and 11 are thus not coaxial but are positioned under an angle.

Because of the tilted positioning of the disks 7 and 8 the distance 'n' between said disks at the inlet end of the pump 1 is larger than the distance 'm' between said disks at the outlet 5. In use the material entering the pump will be captured between the disks at a location wherein the distance 'n' between said disks is large. When the material moves with the direction of the disks the space between said disks will continuously decrease from a distance 'n' to a shorter distance 'm'. The material will be compressed while being transported between said disks. This will provide a natural gas lock required to overcome the pressure difference between the lower pressure environment at inlet 4 and the higher pressure environment at outlet 5.

At positions 14 a sealing face may advantageously be present to avoid gas flowing from the high-pressure environment to the low-pressure environment. The sealing face is preferably made of a so-called wear and tear resistant material. Such materials are well known and Teflon is an example of such a material.

A motor (not shown) will drive the axis 10 and 11. A spring loading 15 is present to position the disks 7 and 8 and scraper 9 into its vicinity.

Figure 3:
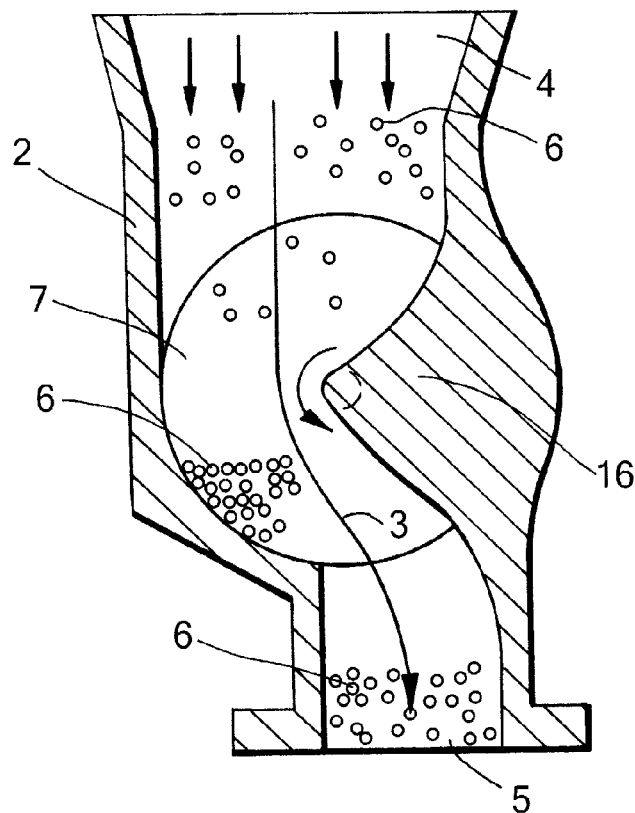
FIG. 3 is a cross-sectional side view of the bulk materials pump having a fixed scraper.
Figure 4:
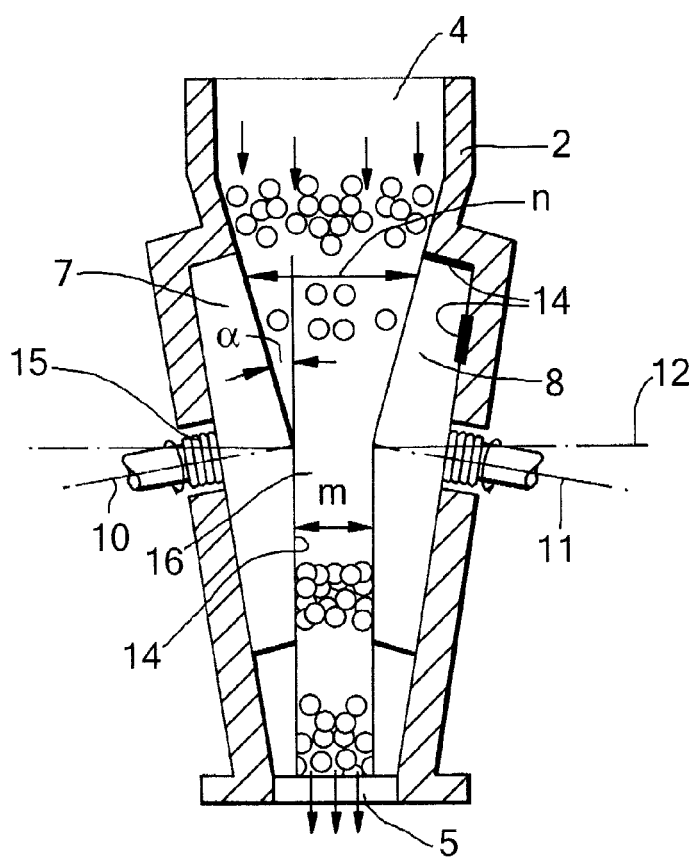
FIG. 4 is a cross-sectional front view of the bulk materials pump of FIG. 3.

FIGS. 3 and 4 show a bulk materials pump having a fixed materials scraper 16, which is located partly between said drive disks 7 and 8 and fixed to the housing 2. The other reference numbers have the same meaning as in FIGS. 1 and 2.

The bulk materials pump according to the present invention may be used to transport, meter and/or more preferably bring bulk material to a higher-pressure environment. The bulk materials pump may be used in series. This may be advantageous when a large pressure difference has to be overcome. The bulk materials pump may also be used in parallel to increase capacity. Preferably the solids material pump is used to bring a solid carbonaceous feedstock under a higher pressure such as to make it suitable as a dry feedstock for an entrained flow gasification process. Examples of such processes are described in Gasification, by Christofer Higman and Maarten van der Burgt, 2003, Elsevier Science, Burlington Mass., Pages 109-128. In such processes the solids material is preferably increased in pressure from ambient to a pressure between 2 and 10 MPa. A preferred application is to use the pump to feed a pressurized feedstock vessel of a gasification process as described in U.S. Pat. No. 4,830,545.

The solids which may be processed by the present bulk materials pump are coal, as for example anthracite, brown coal, bituminous coal, sub-bituminous coal, and lignite, petroleum coke, peat and solid biomass, optionally obtained after torrefaction.

The invention claimed is:

1. A bulk materials pump comprising a housing having a flow path for bulk materials located between an inlet and an outlet of said housing,
   wherein said flow path in said housing is further defined by a space between two rotatable drive disks spaced from each other and wherein a materials scraper is present between said drive disks at the outlet to avoid materials being transported between said drive disks back to the inlet,
   wherein the rotation axis of both disks are tilted with respect to each other resulting in that the distance between said drive disks at the inlet is greater than the distance between said disks at the outlet and
   wherein the surfaces of the two drive disks facing the flow path are conical shaped such that at the outlet the two facing surfaces are parallel relative to each other and at the inlet the two surfaces are positioned under an angle relative to each other.

2. A bulk materials pump according to claim 1, wherein the materials scraper is a third rotatable disk located partly between said drive disks at the outlet and wherein the direction of rotation of all three disks is the same.

3. A bulk materials pump according to claim 1, wherein the materials scraper is located partly between said drive disks and fixed to the housing.

4. A bulk materials pump according to claim 1, wherein the inlet is located at the upper end and the outlet is located at the lower end and wherein an angle α between an upright surface of the disk facing the flow path and a vertical is between 5 and 45°.

5. A process to bring a bulk material from a lower pressure environment to a higher-pressure environment wherein a bulk materials pump according to claim 1 is used.

6. A process according to claim 5, wherein in the bulk materials pump a materials scraper is present, which materials scraper is a third rotatable disk located partly between drive disks at the outlet and wherein the direction of rotation of all three disks is the same.

7. A process according to claim 5, wherein in the bulk materials pump a materials scraper is present, which materials scraper is located partly between drive disks and fixed to the housing of the bulk materials pump.

8. A process according to claim 5, wherein the bulk materials pump comprises a housing having a flow path for bulk materials located between an inlet and an outlet of said housing and wherein the inlet is located at the upper end and the outlet is located at the lower end and wherein an angle α between an upright surface of a disk facing the flow path and a vertical is between 5 and 45°.

9. A process according to claim 5, wherein the bulk material is chosen from the group of coal, petroleum coke, peat and solid biomass.

* * * * *